(12) United States Patent
Flock

(10) Patent No.: US 9,126,310 B2
(45) Date of Patent: Sep. 8, 2015

(54) DEVICE FOR POSITIONING CUTTING PARTICLES

(75) Inventor: Marcus Flock, Staad (CH)

(73) Assignee: Hilti Aktiengesellschaft, Schaan (LI)

( * ) Notice: Subject to any disclaimer, the term of this patent is extended or adjusted under 35 U.S.C. 154(b) by 713 days.

(21) Appl. No.: 13/136,073

(22) Filed: Jul. 22, 2011
(Under 37 CFR 1.47)

(65) Prior Publication Data
US 2012/0193854 A1    Aug. 2, 2012

(30) Foreign Application Priority Data
Jul. 23, 2010    (DE) .......................... 10 2010 038 324

(51) Int. Cl.
*B25B 11/00*    (2006.01)
*B24D 18/00*    (2006.01)
*B23D 61/18*    (2006.01)

(52) U.S. Cl.
CPC ............ *B24D 18/0054* (2013.01); *B23D 61/18* (2013.01); *B24D 18/0009* (2013.01)

(58) Field of Classification Search
USPC ........................................................ 269/21
See application file for complete search history.

(56) References Cited

U.S. PATENT DOCUMENTS

| | | | | |
|---|---|---|---|---|
| 3,809,050 A * | 5/1974 | Chough et al. ................... | 125/35 |
| 4,680,199 A * | 7/1987 | Vontell et al. ................. | 427/199 |
| 6,095,506 A * | 8/2000 | Schmalz et al. ................ | 269/21 |
| 6,669,745 B2 * | 12/2003 | Prichard et al. ................. | 51/297 |
| 6,821,189 B1 * | 11/2004 | Coad et al. ........................ | 451/41 |
| 7,007,833 B2 * | 3/2006 | Mackay et al. ............... | 228/44.7 |
| 7,367,875 B2 * | 5/2008 | Slutz et al. ..................... | 451/443 |
| 7,368,013 B2 * | 5/2008 | Sung ............................... | 117/79 |
| 7,404,857 B2 * | 7/2008 | Sung ............................... | 117/79 |
| 7,419,420 B2 * | 9/2008 | Togawa et al. ..................... | 451/7 |
| 7,585,366 B2 * | 9/2009 | Sung ............................... | 117/79 |
| 7,780,005 B2 * | 8/2010 | Allison et al. ................ | 206/460 |
| 7,883,394 B2 * | 2/2011 | Togawa et al. ..................... | 451/7 |
| 8,377,158 B2 * | 2/2013 | Palmgren et al. ............... | 51/297 |
| 2007/0264918 A1 * | 11/2007 | Sung ............................ | 451/533 |
| 2009/0142435 A1 | 6/2009 | Sakakibara et al. | |
| 2010/0194012 A1 * | 8/2010 | Tatsumi et al. ................. | 269/21 |

FOREIGN PATENT DOCUMENTS

| | | |
|---|---|---|
| CN | 1034879 | 8/1989 |
| EP | 0 452 618 | 10/1991 |
| JP | S63232934 | 9/1988 |
| JP | 04336907 | 11/1992 |
| JP | 04336967 | 11/1992 |
| JP | 2001315062 | 11/2001 |
| JP | 2008302482 | 12/2008 |

(Continued)

*Primary Examiner* — Lee D Wilson
*Assistant Examiner* — Alvin Grant
(74) *Attorney, Agent, or Firm* — Davidson, Davidson & Kappel, LLC

(57) ABSTRACT

A device (1) for positioning cutting particles (2a-c), including a receiver (4) that has a first receiving opening (5a) to receive a first cutting particle (2a), and a second receiving opening (5b) to receive a second cutting particle (2b), and comprising a unit or generator (7) for generating a holding force that affixes the cutting particles (2a; 2b) in the receiving openings (5a, 5b), and the holding force that affixes the first cutting particle (2a) in the first receiving opening (5a) can be adjusted independently of the holding force that affixes the second cutting particle (2b) in the second receiving opening (5b).

11 Claims, 4 Drawing Sheets

(56) References Cited

FOREIGN PATENT DOCUMENTS

Figure 1:
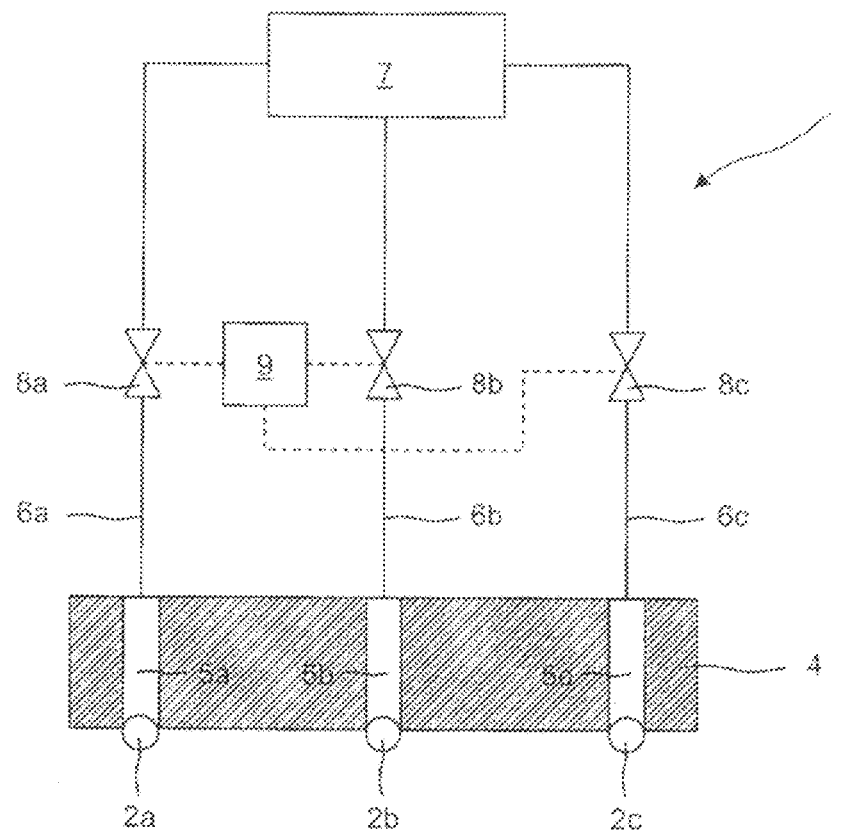
Figure 1:
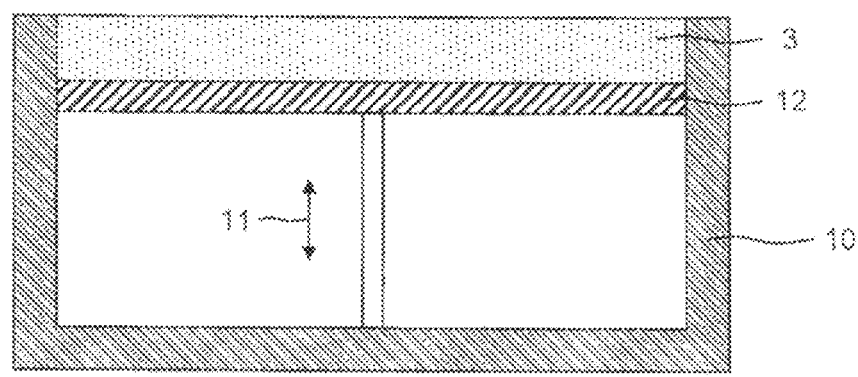

| | | |
|---|---|---|
| JP | 2009136929 | 6/2009 |
| WO | WO8809826 | 12/1988 |
| WO | WO 2008/143464 | 11/2008 |
| WO | WO2010/031089 | 3/2010 |

\* cited by examiner

DEVICE FOR POSITIONING CUTTING PARTICLES

This claims the benefit of German Patent Application DE 10 2010 038 324.4, filed Jul. 23, 2010 and hereby incorporated by reference herein.

The present invention relates to a device for positioning cutting particles.

BACKGROUND

Prior-art tools such as core bits or rotary saw blades, which are used to process reinforced as well as non-reinforced concrete, consist of a main body that is connected to grinding elements configured in the form of segments. The grinding elements have a layered structure consisting of several layers above each other and are made of a basic material into which the cutting particles are embedded. The basic material is pulverulent or in the form of thin, prefabricated platelets. The cutting particles are configured as diamond particles or other abrasive particles that are suitable for abrasive machining. It is a known procedure to arrange the cutting particles uniformly in the grinding element in order to increase the cutting capacity and the service life of the grinding elements. If the cutting particles are admixed into the pulverulent basic material, cutting-particles clusters are formed that have a detrimental effect on the cutting capacity and on the service life of the grinding elements.

European patent specification EP 0 452 618 discloses a device for the production of grinding elements for tools used for abrasive machining. The grinding elements consist of several layers of a sinterable basic material and several layers of cutting particles, said layers being alternatingly incorporated into a negative mold that matches the grinding element. The grinding elements with their layered structure are pressed, compacted and sintered at an appropriately high temperature and high pressure. The device for the production of the grinding elements comprises a first part of the device for applying the basic material, a second part of the device for positioning the cutting particles into or onto the basic material, and a chamber in which the structuring of the grinding element is carried out. The cutting particles are stored in a storage container and are removed from the storage container by means of the second part of the device and positioned onto or into the basic material.

The second part of the device for positioning the cutting particles comprises a receiving means that is connected to a unit for generating a holding force. The receiving means is configured as a suction plate and has several receiving openings that receive the cutting particles. The holding forces with which the cutting particles are affixed in the receiving openings are generated simultaneously in all of the receiving openings via a pressure chamber that is connected by a connecting line to a negative-pressure unit. The arrangement of the receiving openings in the suction plate corresponds to the desired arrangement of the cutting particles on or in the basic material. The suction plate is configured so as to be replaceable.

SUMMARY OF THE INVENTION

The prior-art device for positioning cutting particles comprises several suction plates that differ in terms of the formation of the receiving openings. A drawback is that the operator has to replace the suction plate if the cutting particles are supposed to be arranged differently in layers of the grinding element that lie above each other.

It would be desirable to be able to select different arrangements of the cutting particles in layers of the grinding element that lie above each other, without the operator having to replace the suction plate.

It is an object of the present invention to refine a device for positioning cutting particles in such a way that at least two different arrangements of the cutting particles can be automatically generated without replacing the receiving means.

The present invention provides that the holding force that affixes the first cutting particle in the first receiving opening can be adjusted independently of the holding force that affixes the second cutting particle in the second receiving opening. A receiving means or receiver in which the holding forces of the individual receiving openings can be adjusted independently of each other entails the advantage that different geometrical arrangements of the cutting particles can be created without the need to replace the receiving means.

Preferably, the receiving means has an additional receiving opening to receive an additional cutting particle, and there is also a unit for generating a holding force that affixes the additional cutting particle in the additional receiving opening. The more receiving openings of the receiving means can be regulated independently of each other, the more different geometrical arrangements for the cutting particles can be generated.

In a first preferred variant, the holding force that affixes the additional cutting particle in the additional receiving opening can be adjusted, independently of the holding force of the first receiving opening and independently of the holding force of the second receiving opening. One embodiment of the receiving means in which each receiving opening can be individually regulated by a control unit has the advantage that any desired geometrical arrangements can be selected without replacing the receiving means.

In a second preferred variant, the holding force that affixes the additional cutting particle in the additional receiving opening can be adjusted together with the holding force of the first receiving opening or together with the holding force of the second receiving opening. In actual practice, it is often sufficient for certain geometrical arrangements of the cutting particles to be adjustable. The technical effort involved can be reduced if there is no need for an individual regulation of every single receiving opening.

In another preferred embodiment, the receiving means has a first group of receiving openings and a second group of receiving openings, and the holding force of the second group of receiving openings can be adjusted independently of the holding force of the first group of receiving openings.

Preferably, the means for generating a holding force, or generator, comprises a negative-pressure unit that generates a holding force in the receiving openings. Here, special preference is given to providing a first connecting line that connects the first receiving opening or the first group of receiving openings to the negative-pressure unit, and a second connecting line that connects the second receiving opening or the second group of receiving openings to the negative-pressure unit.

The holding force of the first receiving opening or of the first group of receiving openings can especially preferably be adjusted by means of a first valve device, independently of the holding force of the second receiving opening or of the second group of receiving openings, that can be adjusted by means of a second valve device. In this context, the valve devices are configured in a first variant such that they can be switched between a closed position and an open position. In a second variant, the throughput rate can be set in several discrete stages or else continuously. To this end, the valve devices are connected to a control unit that is either integrated into the negative-pressure unit or that is configured as a separate control unit.

Preferably, the receiving means has a receiving plate that comprises the receiving openings, and a connection plate that can be connected pressure-tight to the receiving plate by a locking means. The configuration of a two-part receiving means having a receiving plate and a connection plate makes it possible for several receiving openings to be combined and regulated together.

In this context, a first connecting channel system that connects the first receiving openings to a first connection element, and a second connecting channel system that connects the second receiving openings to a second connection element are provided, especially preferably in a first variant in the connection plate, and in a second variant in the receiving plate. The two-part structure of the receiving means consisting of a receiving plate and a connection plate has the advantage that the connecting channel systems can be milled into the top of the receiving plate or into the bottom of the connection plate, and the pressure-tight closure of the receiving means is created by means of the second plate and a locking means. This structure reduces the technical resources needed for the production of the connecting channels.

If the connecting channel systems are situated in the connection plate, other geometrical arrangements of the cutting particles can be selected by replacing the connection plate. Numerous receiving openings that are configured as passage holes are arranged uniformly in the receiving plate. Owing to the layout of the connecting channel systems in the connection plate, different receiving openings can be combined to form a group.

Embodiments of the invention will be described below on the basis of the drawing. The drawing does not necessarily depict the embodiments true-to-scale, but rather, it is presented in schematic and/or slightly distorted form whenever this serves for purposes of illustration. Regarding additions to the teaching that can be derived directly from the drawing, reference is hereby made to the pertinent state of the art. In this context, it should be taken into consideration that many modifications and changes can be made in terms of the form and the details of a given embodiment, without departing from the general idea of the invention. The features of the invention disclosed in the description, in the drawing as well as in the claims, be it individually or in any desired combination, can all be essential for refining the invention. Moreover, all combinations of at least two of the features disclosed in the description, in the drawing and/or in the claims fall within the scope of the invention. The general idea of the invention is not limited to the exact form or details of the preferred embodiment shown and described below, nor is it limited to a subject matter that would be restricted in comparison to the subject matter claimed in the claims. Regarding the dimensional ranges given, values that fall within the cited limits can also be disclosed as limit values and can be employed and claimed as desired. For the sake of simplicity, the same reference numerals will be used below for identical or similar parts or for parts having an identical or a similar function.

DETAILED DESCRIPTION

Other advantages, features and details of the invention ensue from the description below of preferred embodiments as well as from the drawing.

Figure 2A:
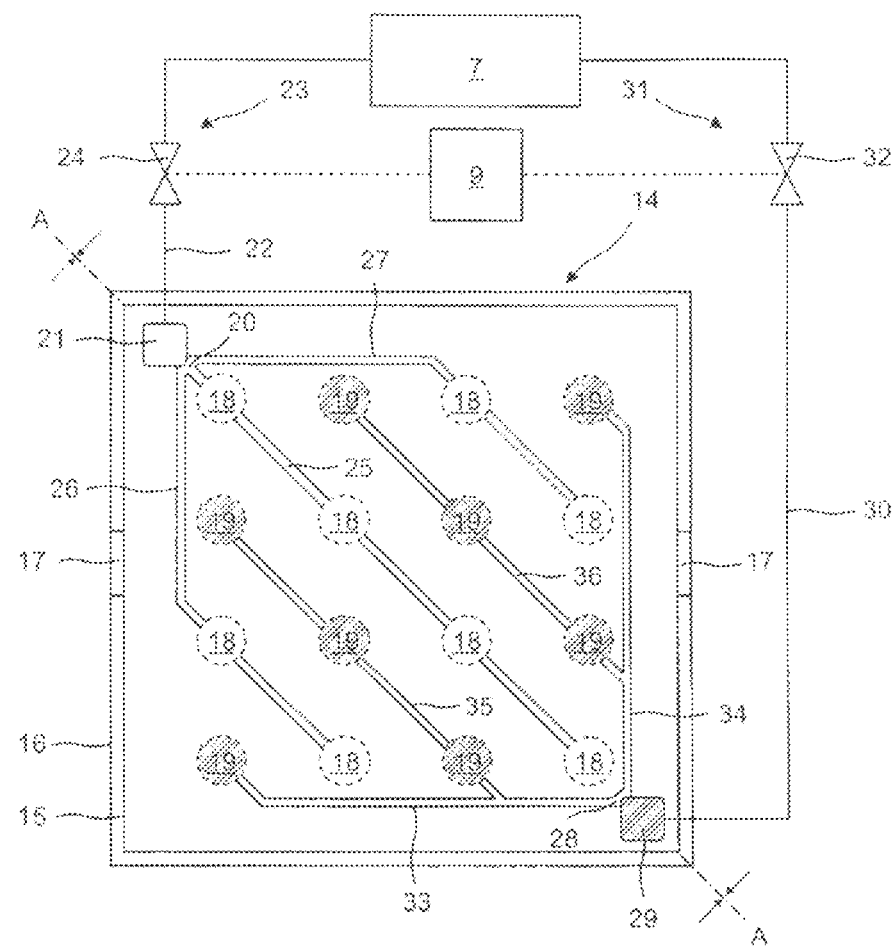
Figure 2B:
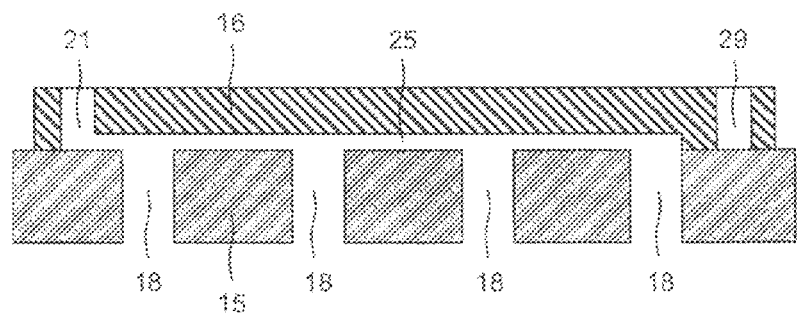
Figure 3A:
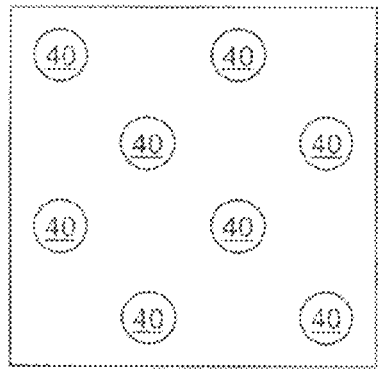
Figure 4:
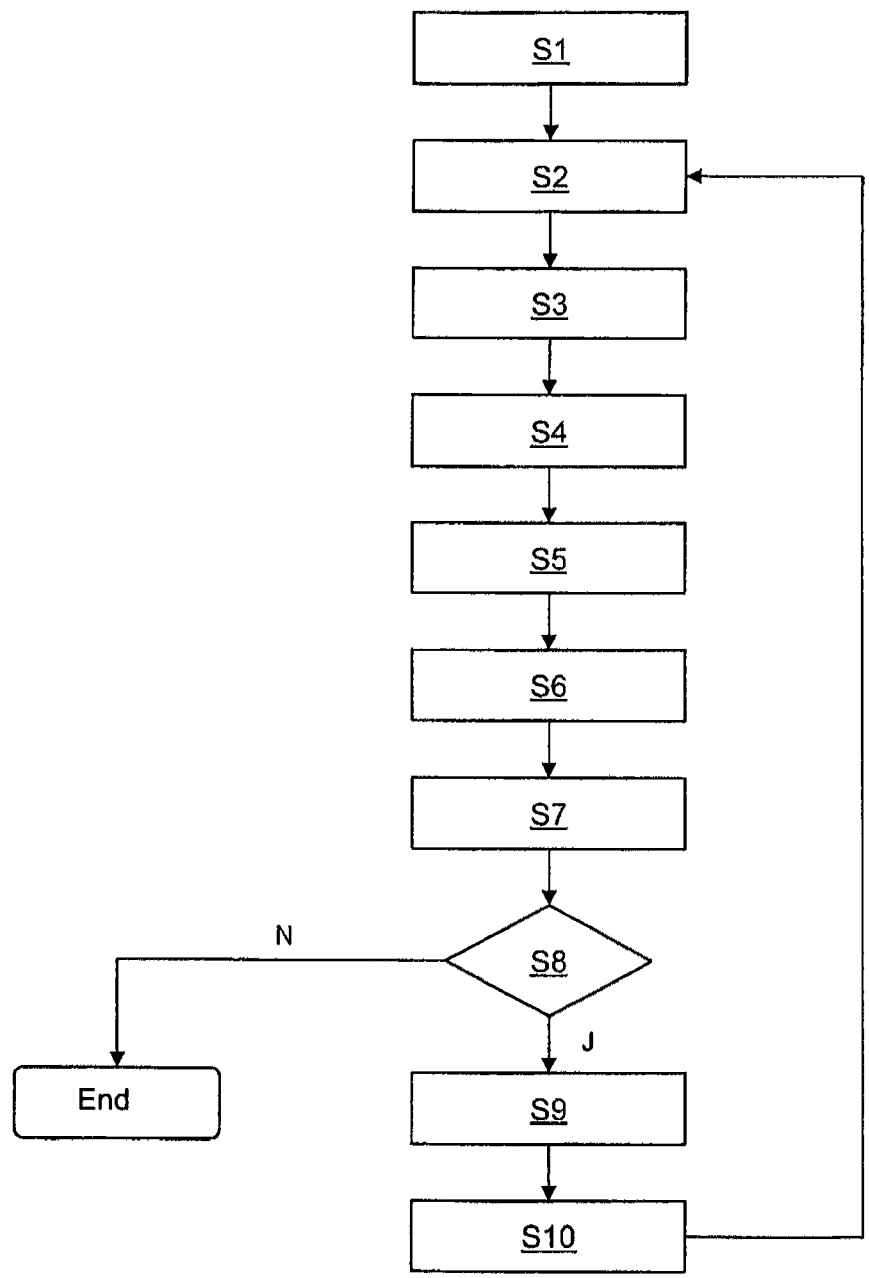

The following is shown:

FIG. 1—a device according to the invention for positioning cutting particles in a basic material and having a receiving means that is configured in one part and that affixes the cutting particles in the receiving openings by means of a negative-pressure unit;

FIGS. 2a,b—a two-part receiving means consisting of a receiving plate having several receiving openings and a connection plate in a view from below onto the connection plate (FIG. 2a) and in a sectional view along the line A-A;

FIGS. 3a,b—three different geometrical arrangements of cutting particles that can be selected using the receiving means of FIG. 2; and FIG. 4—a method for positioning cutting particles in a basic material using the two-part receiving means of FIG. 2.

DETAILED DESCRIPTION

FIG. 1 shows a device 1 according to the invention for positioning cutting particles 2 in a basic material 3, in a schematic representation.

The device 1 comprises a receiving means or receiver 4 configured as a suction plate having three receiving openings 5a-c that are designated as the first receiving opening 5a, the second receiving opening 5b and the third receiving opening 5c. The receiving openings 5a-c are connected via connecting lines 6a-c to a device for generating a holding force, said device being configured in the form of a negative-pressure unit 7. The connecting lines 6a-c have valve devices 8a-c that can be switched between a closed position and an open position by means of a control unit 9. The negative pressure or the suction pressure in the three receiving openings 5a-c can be adjusted independently of each other. Alternatively, the valve devices 8a-c of the second and third receiving openings 5b, 5c can be coupled to each other. In this case, the negative pressure or the suction force in the first receiving opening 5a can be adjusted independently of the negative pressure or of the suction force of the second and third receiving openings 5b, 5c. The suction force is switched on in the second and third receiving openings 5b, 5c together, so that cutting particles are held in both receiving openings 5b, 5c.

The receiving means of FIG. 1 includes a one-part suction plate having receiving openings 5a-c that are configured as passage holes and that are connected to the negative-pressure unit 7 via connecting lines 6a-c. The passage holes serve to receive the cutting particles and on the one hand, and to connect the connecting lines 6a-c on the other hand. In the area where the cutting particles are held by means of negative pressure, the shape and size of the passage holes are adapted to the cutting particles. The receiving openings 5a-c are configured in such a way that the cutting particles are not sucked into the connecting lines 6a-c through the receiving openings 5a-c, and the cutting particles are securely held in the receiving openings 5a-c by the negative pressure.

The device 1 according to the invention for positioning cutting particles 2a-c is part of a device for the production of grinding elements for core bits, rotary saw blades and other tools used for abrasive machining. The grinding elements have a layered structure consisting of several layers above each other and are made of the pulverulent basic material 3 into which the cutting particles 2a-c are embedded. The cutting particles are configured as diamond particles or as other abrasive particles that are suitable for abrasive machining. The pulverulent basic material 3 is structured in a chamber 10 that matches the grinding elements that are to be structured. The chamber 10 has a platform 12 that is adjustable in a direction 11.

FIGS. 2a, b show a two-part receiving means 14 in a schematic view (FIG. 2a) and in a sectional view along the line A-A (FIG. 2b). The receiving means 14 consists of a first plate 15 and of a second plate 16. The first plate 15 has several receiving openings to receive cutting particles and is designated as a receiving plate. The second plate 16 serves to connect the receiving means 14 to the negative-pressure unit 7 and is designated as the connection plate. The connection plate 16 can be connected pressure-tight to the receiving plate 15 by a locking means 17. The two-part receiving means 14 can replace the receiving means 4 of the device 1 according to the invention for positioning cutting particles.

The receiving plate 15 comprises sixteen receiving openings that are depicted by broken lines and that are configured so as to be identical and arranged in four rows and four columns. The receiving openings of the receiving plate 15 are divided into a first group of receiving openings that are designated as first receiving openings 18, and a second group of receiving openings that are designated as second receiving openings 19. The first and second receiving openings 18, 19 are each arranged in one row and in one column adjacent to each in such a way as to yield a regular pattern of the first and second receiving openings 18, 19. As an alternative, the first and second receiving openings can have differing geometries so that the first and second receiving openings can receive cutting particles of difference sizes.

The first receiving openings 18 are connected to the negative-pressure unit 7 via a first connecting channel system 20, a first connection element 21 and a first connecting line 22. The connecting channel system 20, the connect element 21 and the connecting line together form a first connecting line 23 between the first receiving openings 18 and the negative-pressure unit 7.

In the embodiment shown in FIGS. 2a,b, the first and second receiving openings 18, 19 of the receiving plate 15 are configured as passage holes, and, on the side facing the receiving plate 15, the connection plate 16 has the first connecting channel system 20, which is milled into the connection plate 16. Alternatively, the first connecting channel system is arranged in the receiving plate 15 and the receiving openings are configured as blind holes in the receiving plate 15. The connection plate seals the first connecting channel system pressure-tight.

In the first connecting line 23, there is a first valve device 24 by means of which the connecting line 23 can be switched between an open position and a closed position so that the holding force of the first receiving openings 18 can be controlled. Moreover, the strength of the holding force in the first receiving openings 18 can be regulated by means of the first valve device 24. The first valve device 24 is arranged in the first connection line 22. As an alternative, the first valve device 24 can be integrated into the negative-pressure unit 7 or into the first connection element 21.

The first connecting channel system 20 connects the first receiving openings 18 to the first connection element 21. Here, several or all of the first receiving openings 18 can be connected to the first connection element 21 via a shared connecting channel. In the embodiment shown in FIG. 2a, the first connecting channel system 20 has three connecting channels 25, 26, 27 that connect the first receiving openings 18 to the first connection element 21.

The second receiving openings 19 are connected to the negative-pressure unit 7 via a second connecting channel system 28, a second connection element 29 and a second connection line 30 that together form a second connecting line 31. A second valve device 32 is provided in the second connecting line 31. The second connecting channel system 28 comprises four connecting channels 33-36, said connecting channels 33, 34 being connected directly to the second connection element 29, and the connecting channels 33, 36 opening into the connecting channels 33, 34. Alternatively, the connecting channels 35, 36 can open directly into the second connection element 29.

The two-part receiving means 14 shown in FIGS. 2a,b and having the receiving plate 15 and the connection plate 16 allows three different geometrical arrangements of the cutting particles in one layer, without requiring the receiving means 14 to be replaced. The FIGS. 3a-c show three different geometrical arrangements of the cutting particles in one layer that the receiving means 14 of FIGS. 2a,b can generate.

FIG. 3a shows the geometrical arrangement of eight cutting particles 40 that have been affixed in the first receiving openings 18 of the receiving means 14. In order to generate holding forces in the first receiving openings 18, the first connecting line 23 has been opened by using the first valve device 24, while the second connecting line 31 has been closed by using the second valve device 32. The negative-pressure unit 7 generates holding forces in the first receiving openings 18 and these holding forces affix the cutting particles 40.

Figure 3B:
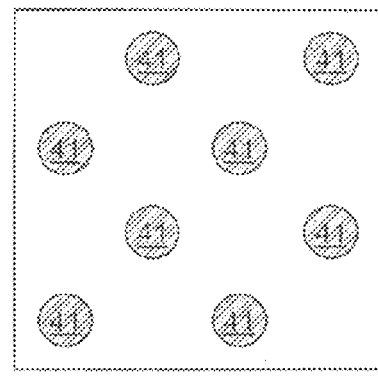

FIG. 3b shows the geometrical arrangement of eight cutting particles 41 that have been affixed in the second receiving openings 19 of the receiving means 14. In order to generate holding forces in the second receiving openings 19, the first connecting line 23 has been closed by using the first valve device 24, while the second connecting line 32 has been opened by using the second valve device 32. The negative-pressure unit 7 generates holding forces in the second receiving openings 19 and these holding forces affix the cutting particles 40.

Figure 3C:
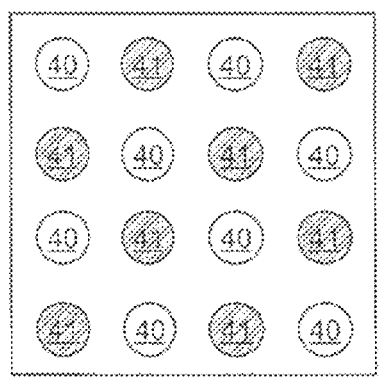

FIG. 3c shows the geometrical arrangement of sixteen cutting particles 40, 41 that have been affixed in the first and second receiving openings 18,19 of the receiving means 14. In order to generate holding forces in the first and second receiving openings 18,19, the first connecting line 23 has been opened by using the first valve device 24, while the second connecting line 31 has been opened by using the second valve device 32.

FIG. 4 shows a method for positioning cutting particles in a basic material 3 using the two-part receiving means 14 of FIGS. 2a,b. The method for positioning cutting particles is part of a method for the production of grinding elements for core bits, saw blades and other tools used for abrasive machining. The grinding elements have a layered structure consisting of several layers above each other and are made of the pulverulent basic material 3 into which the cutting particles 2a-c are embedded.

In a step S1, the operator selects the receiving openings 18, 19 of the receiving means 14 that are intended to receive the cutting particles. In this context, the operator can select the receiving openings individually or he can select a preset formation of receiving openings from a list. When several layers are produced one above the other, the operator decides for each layer which receiving openings 18, 19 are going to affix the cutting particles. In this process, the cutting particles are positioned differently in layers that lie directly one above the other, for instance, as shown in FIGS. 3a and 3b.

Once the preparation by the operator has been completed, the stepwise structuring of the grinding element starts. In a step S2, the receiving means 14 is moved into a storage container that is filled with cutting particles 40, 41. This position is designated as the loading position of the receiving means 14. In a step S3, the control unit 9 establishes the connecting lines between the negative-pressure unit 7 and the receiving openings 18, 19 selected for the layer, which is done by opening the appropriate valve devices 24, 32, as a result of which holding forces that affix the cutting particles in the receiving openings are generated in the selected receiving openings.

In a first variant, the negative-pressure unit 7 is active during the entire process and the holding force in the selected receiving openings is created by opening the valve devices. The first variant is suitable for short waiting times between the structuring of layers that lie one above the other, and also in cases when the negative-pressure unit 7 remains switched on for a long time. In a second variant, the negative-pressure unit 7 is switched on and off by the control unit. The second variant is suitable for long waiting times between the structuring of layers that lie one above the other, and in cases when the negative-pressure unit 7 remains switched on for a short time.

In a step S4, the receiving means 14 is moved out of the loading position into an unloading position. In the unloading position, the receiving means 14 is arranged above the chamber 10. In a step S5, the negative-pressure unit 7 reduces the negative pressure to such an extent that the cutting particles are released from the receiving openings and fall onto or into the basic material 3. The releasing of the cutting particles from the receiving openings can be enhanced by a surge of compressed air. In this context, the compressed air surge can only be of such a magnitude that the geometrical arrangement of the cutting particles on or in the basic material 3 remains intact.

In a step S6, the receiving means 14 is moved out of the unloading position into the loading position or, if no further cutting particles are to be positioned, it is moved into an initial position. The basic material 3 and the cutting particles are compacted in a step S7, for instance, by means of a punch.

In a step S8, it is checked whether an additional layer is to be structured. If an additional layer is to be structured (J in S8), then the adjustable platform 12 is moved downwards in the direction 11 by the desired layer thickness in a step S9, and, in a step S10, an additional layer of basic material 3 is applied and smoothed out. The method is continued with step S2. If no additional layer is to be structured (N in S8), the process is terminated.

What is claimed is:

1. A device for positioning cutting particles, the device comprising:
   a receiver having a first group of receiving openings receiving first cutting particles, the first group including a first receiving opening receiving one of the first cutting particles and having a second group of receiving openings receiving second cutting particles, the second group including a second receiving opening receiving one of the second cutting particles; and
   a generator for generating a first holding force affixing the first cutting particles in the first group of receiving openings adjustable independently of a second holding force affixing the second cutting particles in the second group of receiving openings.

2. The device as recited in claim 1 wherein the receiver has an additional receiving opening to receive an additional cutting particle, and the generator generates a further holding force affixing the additional cutting particle in the additional receiving opening.

3. The device as recited in claim 2 wherein the further holding force affixing the additional cutting particle in the additional receiving opening is adjustable independently of the first holding force of the first receiving opening and independently of the second holding force of the second receiving opening.

4. The device as recited in claim 2 wherein the further holding force affixing the additional cutting particle in the additional receiving opening is adjustable together with the first holding force of the first receiving opening or together with the second holding force of the second receiving opening.

5. The device as recited in claim 1 wherein the generator comprises a negative-pressure unit generating the first and second holding forces in the first and second receiving openings.

6. The device as recited in claim 5 further comprising a first connecting line connecting the first receiving opening to the negative-pressure unit, and a second connecting line connecting the second receiving opening to the negative-pressure unit.

7. The device as recited in claim 6 wherein the first holding force of the first receiving opening is adjustable by a first valve device independently of the second holding force of the second receiving opening, the second holding force being adjustable by a second valve device.

8. The device as recited in claim 1 wherein the receiver has a receiving plate comprising the first and second receiving openings and a connection plate connectable in a pressure-tight manner to the receiving plate by a lock.

9. The device as recited in claim 8 wherein the connection plate has a first connecting channel system connecting the first receiving opening to a first connection element, and a second connecting channel system connecting the second receiving opening to a second connection element.

10. The device as recited in claim 8 wherein the receiving plate has a first connecting channel system connecting the first receiving openings to a first connection element, and a second connecting channel system connecting the second receiving openings to a second connection element.

11. The device as recited in claim 1 wherein the receiver has a third receiving opening.

* * * * *